United States Patent [19]

Overbeek et al.

[11] Patent Number: 5,962,571
[45] Date of Patent: Oct. 5, 1999

[54] PRODUCTION OF AQUEOUS POLYMER COMPOSITIONS

[75] Inventors: Gerardus Cornelis Overbeek, Waalwijk; Yvonne Wilhelmina Smak, Niewegein; Alfred Jean Paul Buckmann, 'sHertogenbosch, all of Netherlands

[73] Assignee: Zeneca Resins B.V., Waalwijk, Netherlands

[21] Appl. No.: 08/737,091

[22] PCT Filed: Apr. 27, 1995

[86] PCT No.: PCT/IB95/00331

§ 371 Date: Nov. 1, 1996

§ 102(e) Date: Nov. 1, 1996

[87] PCT Pub. No.: WO95/29963

PCT Pub. Date: Nov. 9, 1995

[30] Foreign Application Priority Data

May 3, 1994 [GB] United Kingdom ............... 9408725

[51] Int. Cl.⁶ ...................................... C08F 2/16
[52] U.S. Cl. ................... 524/460; 428/460; 428/462; 428/463; 428/514; 523/201; 523/403; 523/404; 523/410; 523/411; 523/412; 524/507; 524/517; 524/520; 524/521; 524/522
[58] Field of Search ................... 524/460, 507, 524/517, 520, 521, 522; 523/201, 403, 404, 410, 411, 412; 428/460, 462, 463, 514

[56] References Cited

U.S. PATENT DOCUMENTS

| | | | |
|---|---|---|---|
| 4,150,005 | 4/1979 | Gehman et al. ................... 260/28.5 |
| 4,151,143 | 4/1979 | Blank et al. . | |
| 4,250,070 | 2/1981 | Ley et al. ........................ 260/29.6 |
| 4,325,856 | 4/1982 | Ishikawa et al. ................. 523/201 |
| 4,351,875 | 9/1982 | Arkens ............................. 428/290 |
| 4,465,803 | 8/1984 | Nakayama ....................... 524/460 |
| 4,628,071 | 12/1986 | Morgan .......................... 524/832 |
| 4,786,676 | 11/1988 | Blum et al. ..................... 826/460 |
| 4,820,762 | 4/1989 | Tsaur ............................. 524/460 |
| 4,845,149 | 7/1989 | Frazee ........................... 526/458 |
| 4,876,313 | 10/1989 | Lorah ............................ 525/281 |
| 4,894,397 | 1/1990 | Morgan et al. ................. 523/201 |
| 4,904,724 | 2/1990 | Auchter et al. ................. 524/458 |
| 4,916,171 | 4/1990 | Brown et al. ................... 523/161 |
| 4,923,919 | 5/1990 | Frazee ........................... 524/460 |
| 4,931,494 | 6/1990 | Auchter et al. ................. 524/460 |
| 4,952,623 | 8/1990 | Auchter et al. ................. 524/517 |
| 5,073,591 | 12/1991 | Tsaur ............................. 524/460 |
| 5,306,743 | 4/1994 | Klesse et al. .................. 523/201 |
| 5,403,894 | 4/1995 | Tsai et al. ..................... 525/285 |

FOREIGN PATENT DOCUMENTS

| | | | |
|---|---|---|---|
| 2066988 | 10/1992 | Canada ........................... C08F 2/16 |
| 0 288 763 B1 | 11/1988 | European Pat. Off. ......... C08F 8/44 |
| 0 304 788 B1 | 3/1989 | European Pat. Off. . | |
| 320 865 | 6/1989 | European Pat. Off. . | |
| 376 096 | 7/1990 | European Pat. Off. . | |
| 555774 | 8/1993 | European Pat. Off. . | |
| 587 333 | 3/1994 | European Pat. Off. . | |
| WO94/09045 | 4/1994 | WIPO . | |

Primary Examiner—Judy M. Reddick
Attorney, Agent, or Firm—Pillsbury Madison & Sutro, LLP

[57] ABSTRACT

Process for making organic solvent-free aqueous crosslinkable polymer composition comprising: a) preparing an aqueous solution of an acid-functional oligomer with Tg 10 to 125° C. and having crosslinker functional groups; b) conducting an aqueous emulsion polymerization to make an aqueous emulsion of an olefinic hydrophobic polymer in the presence of the aqueous oligomer solution, the hydrophobic polymer having Tg at least 25° C. below that of the oligomer and optionally crosslinker functional groups, and c) combining with a crosslinking agent reactable with the crosslinker groups of the oligomer and polymer, said composition having Koenig hardness of ≧40 sec and minimum film forming temperature (MFFT) ≦55° C. Also the aqueous composition so formed and its use in various applications. The aqueous composition has excellent properties and in particular an advantageous balance of MFFT and Koenig hardness.

54 Claims, No Drawings

PRODUCTION OF AQUEOUS POLYMER COMPOSITIONS

This application is the national phase of international application PCT/IB95/00331, filed Apr. 27, 1995 which designated the U.S.

The present invention relates to a process for the production of certain aqueous crosslinkable polymer compositions useful for coating, to the aqueous compositions so produced, and to their use in coating applications.

There is an ever increasing impetus to replace or supplement solvent-based polymer coating compositions with aqueous-based counterparts due to the environmental toxicity and flammability problems posed by the use of volatile organic solvents. However, even where aqueous-based polymer compositions have been devised, their production has usually entailed the intermediate use of organic solvents, requiring subsequent removal which is costly and time-consuming, or the incorporation of a certain amount of a solvent in the final composition which acts to ensure proper film-formation on coating (known as a coalescing solvent). There is therefore also now increasing pressure to significantly reduce or eliminate the volatile organic contents (VOC's) in aqueous-based polymer composition syntheses both as components in their production (even if subsequently removed) and in the resulting composition as an aid to film coalescence.

Further still, even if one can achieve a solvent-free aqueous polymer coating composition, it has been found difficult to achieve one with a balance of good properties conventionally required in most coating compositions, particularly acceptably high hardness and low minimum film forming temperature (MFFT). It should also have good water and solvent resistance, and good storage stability.

We have now invented a process which enables such compositions to be prepared. In particular, the process of the invention produces in most cases in the resulting composition an exceptionally advantageous combination of MFFT and hardness wherein one obtains in a given composition an exceptionally high hardness opposite the particular MFFT of that composition.

According to the present invention there is provided a process for the production of an organic solvent-free aqueous crosslinkable polymer composition useful for coating, which process is organic solvent-free and comprises:

a) preparing an aqueous solution of an acid-functional oligomer built from olefinically unsaturated monomers, said oligomer having a number average molecular weight Mn within the range of from 500 to 50,000 (preferably 2000 to 25000), a glass transition temperature Tg within the range of 10 to 125° C. (preferably 50 to 125° C.), said oligomer being formed using an organic solvent-free aqueous emulsion or aqueous solution polymerisation process, and said acid functionality rendering the oligomer water-soluble per se or by neutralization, and said oligomer also having functional groups for imparting crosslinkability when the aqueous polymer composition is subsequently dried, b) conducting an aqueous emulsion polymerization process to form an aqueous emulsion of a hydrophobic polymer from at least one olefinically unsaturated monomer in the presence of the aqueous solution of the oligomer, said hydrophobic polymer having a Tg which is at least 25° C. lower than the Tg of said oligomer (preferably at least 40° C. lower), and said hydrophobic polymer optionally having functional groups for imparting crosslinkability when the aqueous polymer composition is subsequently dried, and c) combining the aqueous emulsion from b) with a crosslinking agent by addition of the crosslinking agent after the polymerisation of step b) and/or performing the polymerisation in the presence of the crosslinking agent, said crosslinking agent being reactable with the crosslinker functional groups of the oligomer and (if present) of the hydrophobic polymer on subsequent drying to effect crosslinking, wherein said crosslinking agent is not an agent which effects crosslinking by the formation of ionic bonds, and wherein further, said polymer composition on drying has a Koenig hardness of at least 40 sec (preferably within the range 60 to 200 sec) and said polymer composition has a minimum film forming temperature of $\leq 55°$ C. (preferably within the range 0 to 30° C.).

There is also provided an aqueous polymer composition which is formable by a process as defined supra.

There is further provided the use of an aqueous polymer composition as defined supra in coating applications, and in particular in the protective coating of substrates such as wood, plastics, metal and paper.

The prior art discloses a number of processes in which an aqueous emulsion of a polymer system containing a low molecular weight hydrophilic polymer and a hydrophobic emulsion polymer has been produced by a multistage process and in which (often) the hydrophilic oligomer has been solubilized in the aqueous medium.

U.S. Pat. No. 4,151,143 claims the production of surfactant-free emulsion polymer coating compositions using a process which involves (1) a first stage wherein organic solution-prepared carboxyl-functional polymer is dispersed/solubilized in water by neutralization and (2) a second stage wherein a mixture of polymerisable monomers is subjected to emulsion polymerisation. The first stage polymer can be of relatively low molecular weight, the first and/or second stage polymer is optionally hydroxy-functional and the emulsion can be optionally mixed with an amino-type crosslinker such as hexamethoxymethyl melamine.

U.S. Pat. No. 4,894,394 concerns the production of an inverted core/shell latex by (1) preparing a hydrophilic low molecular weight first stage polymer by aqueous emulsion polymerisation; (2) conducting a second emulsion polymerisation to produce a hydrophobic second stage; and (3) adjusting the pH of the resulting inverted core-shell emulsion to dissolve the first stage. The first and second stage monomers can optionally include hydroxyalkyl(meth) acrylates and glycidyl(meth)acrylate although no emphasis is laid on them.

U.S. Pat. No. 4,845,149 relates to an emulsion polymer preparation (useful as a pressure sensitive adhesive) by emulsion polymerising monomers in the presence of an aqueous solution or dispersion of a carboxyl functional support polymer (of low molecular weight).

U.S. Pat. No. 4,904,724 (=EP 320865) discloses that an organic solvent solution polymer system (a blend of acid-functional and acid-free polymers) is dispersed into water with neutralization and used as the seed for an aqueous emulsion polymerisation. The solution polymers can be carbonyl functional in which case a crosslinker such as polyhydrazide is added.

CA 2,066,988 (=DE 4,113,839) relates to emulsifier-free emulsion polymerisation by polymerisation of ethylenic monomers (A) in an aqueous medium containing a neutralised acid-containing polymer (B) (preferably water-soluble styrene/acrylic acid copolymer of molecular weight 1,000–5,000). The (A) monomers are fed to the aqueous medium during polymerisation and can optionally include amino or glycidyl functional monomers, although crosslinking per se is not mentioned.

EP 0,522,791 is concerned with redispersible polymer powders prepared by a 2-stage aqueous emulsion sequential polymerisation process to make a core/shell polymer emulsion, followed by optional spray drying. In the first stage a low molecular weight carboxy-functional polymer which can optionally include up to 30% hydroxyalkyl(meth) acrylate is polymerised in aqueous emulsion to form the shell part; this is neutralised, and in the second stage, monomers, which can again optionally include up to 30% hydroxyalkyl ester, are polymerised to form the core part, and the aqueous emulsion of core/shell polymer optionally converted by spray drying into a redispersible polymer powder. The core and shell are preferably grafted together in the emulsion by the use of polyfunctional compounds such as allyl methacrylate. The disclosure is silent as to the use of a crosslinking agent to effect curing after any coating formation.

EP 0,587,333 is directed to water-resistant multi-stage polymer aqueous emulsions having an alkali-insoluble polymer and dissolved alkali-soluble, acid-functional oligomer. They are made by sequential aqueous emulsion polymerisation of a monomer system for the oligomer, including an acid functional monomer and optionally a polyfunctional compound, followed by that of a monomer system for the alkali-insoluble polymer optionally including an amine-functional monomer. The purpose of the polyfunctional compound, or the amine functionality of the alkali-insoluble polymer is to cause physical or chemical interaction between the alkali-soluble oligomer and alkali-insoluble polymer while present in the emulsion, e.g. by grafting together of the two phases while forming the final emulsion. Additionally, the aqueous emulsion can incorporate metal ions such as those of Zn, Mg, and Ca so as to create ionic metal/carboxylate crosslinks, which would occur after coating formation from the emulsion. The alkali-soluble oligomer is solubilized in the emulsion either by neutralizing it with a base after completing both polymerisation stages or, less preferably, by neutralizing it with a base before the commencement of the second stage polymerisation to form the alkali-insoluble polymer.

None of the above-discussed disclosures teaches a process having the selected combination of features and integers as defined in the invention process which are utilised to produce a composition suitable for coating having such an advantageous combination of properties as discussed above.

The process of the invention results in an aqueous composition providing a polymeric coating of high hardness (as defined) on substrates such as wood, plastics, metal and paper, the aqueous composition being of low MFFT (as defined). It also achieves coatings of good solvent and water resistance. The process itself is organic solvent-free, as is the resulting aqueous polymer composition. The composition also has good shelf stability.

In particular, the process of the present invention allows the production of compositions which for the most part have an exceptionally advantageous balance of MFFT and Koenig hardness wherein one obtains an unusually high Koenig hardness for the particular value of MFFT of the composition. This is most surprising because the achievement of low MFFT and high hardness in a composition would normally work against each other, i.e. if the composition has a very low MFFT it will tend not to have a particularly high hardness, or a very high hardness for the composition will not be commensurate with a relatively low MFFT.

Being aqueous-based, the lower limit of MFFT for invention compositions will of course be the freezing point of the aqueous carrier phase. This will usually be about 0° C. (perhaps slightly lower because of any dissolved constituent (s) although not usually below −2° C.). Therefore the range of MFFT for the invention compositions will usually be about 0 to 55° C., more usually 0 to 30° C. The Koenig hardness will be $\geq 40$ sec and more usually in the range 60 to 200 sec.

As discussed above, a particularly advantageous feature is that for most compositions of the invention, the combination of MFFT and Koenig hardness is surprisingly exceptionally advantageous. We have in fact found that most compositions of the invention fit the following empirical equation in terms of the relationship of MFFT and Koenig hardness, where H represents Koenig hardness (in secs) and T represents MFFT (in °C.):

$$H \geq 1.5T + 70$$

So, e.g. when T=0° C.; H is $\geq 70$ sec; when T is 5° C., H is $\geq 77.5$ secs; when T is 10° C., H is $\geq 85$° C. sec; when T is 20° C., H is $\geq 100$° C., when T is 40° C., H is $\geq 130$° C. and so on.

Moreover, in many compositions of the invention, though not all, the combination of MFFT and Koenig hardness is even more advantageous than suggested above, and fits the empirical relationship:

$$H \geq 1.5T + 90$$

so e.g. when T is 0° C., H is $\geq 90$ sec; when T is 10° C., H is $\geq 105$ sec; when T is 40° C., H is $\geq 150$ sec, and so on.

Not all compositions yielded by the invention process satisfy one or both of these empirical equations, but most do, as is illustrated by the examples (see later).

The solubilization of the oligomer is effected before carrying out the polymerisation of step b). Solubilization subsequent to the polymerisation to form the hydrophobic polymer, the preferred technique in the process of EP 0,587,333 would incur a worse MFFT/Koenig hardness balance as compared to solubilization prior to making the hydrophobic polymer.

Effecting grafting (or pre-crosslinking) during the formation of the emulsion composition, as described in EP 0,587,333 would likewise result in an inferior balance of MFFT and Koenig hardness as compared to effecting covalent crosslinking after coating formation, as is achieved with the compositions of the invention.

Furthermore, providing ionic crosslinking after coating formation also as described in EP 0,587,333, would detract from the advantageous balance of MFFT and Koenig hardness as achieved by the process of the present invention.

The process of the invention, including the stage of making the oligomer, is organic solvent-free, as is the resulting polymer composition. While solvent-free usually means entirely solvent-free, it will be appreciated that from a practical viewpoint it may sometimes be difficult to exclude very small amounts of organic solvent(s), which would otherwise have no material effect on the process or composition, as e.g. when incorporating a small amount of a commercially-obtained additive which might be carried in a vehicle which is at least partly an organic solvent(s). Therefore organic solvent-free is intended to also extend to substantially organic solvent-free.

In step a) of the process there is formed an aqueous solution of an oligomer of Mn 500 to 50,000 and built from the polymerisation of olefinically unsaturated monomers.

The polymerisation technique employed, which is organic solvent-free, may in principle be an aqueous solution polymerisation process to produce directly an aqueous solution of the oligomer, but is more usually a conventional aqueous emulsion polymerisation process to form an aqueous polymer emulsion or latex. Such a process is extremely well known and need not be described in great detail. Suffice to say that such a process involves dispersing the monomer(s) in an aqueous medium and conducting polymerisation using a free-radical initiator (normally water soluble) and (usually) appropriate heating (e.g. 30 to 120° C.) and agitation (stirring) being employed. The aqueous emulsion polymerisation can be effected with conventional emulsifying agents (surfactants) being used [e.g. anionic and/or non-ionic emulsifiers such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates such as sodium lauryl sulphate, alkali metal salts of sulphonic acids. $C_{12-24}$ fatty alcohols, ethoxylated fatty acids and/or fatty amides, and Na, K and $NH_4$ salts of fatty acids such as Na stearate and Na oleate; aryl-containing analogues of the alkyl-containing surfactants are also useful; other surfactants include phosphates. The amount used is preferably low, preferably 0.3 to 2% by weight, more usually 0.3 to 1% by weight based on the weight of total monomer(s) charged. The polymerisation can employ conventional free radical initiators [e.g. hydrogen peroxide, t-butyl-hydroperoxide, cumene hydroperoxide, persulphates such as $NH_4$ persulphate, K persulphate and Na persulphate; redox systems may be used; combinations such as t-butyl hydroperoxide isoascorbic acid and FeEDTA are useful; the amount of initiator, or initiator system, is generally 0.05 to 3% based on the weight of total monomers charged]. [It will be appreciated that it is not necessary to employ the entire amount of the oligomer prepared from the polymerisation, or an aqueous solution of this entire amount, for the aqueous oligomer solution which is specified in steps a) and b) of the invention process (although it can be if desired); only a portion of it need be used for the purposes of steps a) and b)].

The emulsion polymerisation process when used for step a) may be carried out using an "all-in-one" batch process (i.e. a process in which all the components to be employed are present in the polymerisation medium at the start of polymerisation) or a semi-batch process in which one or more of the components employed (usually at least one of the monomers), is wholly or partially fed to the polymerisation medium during the polymerisation. Although not preferred, fully continuous processes could also be used in principle.

The polymerisation technique employed must of course be such that a low molecular polymer (as defined) is formed, e.g. by employing a chain transfer agent such as one selected from mercaptans (thiols), certain halohydrocarbons and a-methyl styrene, as is quite conventional. By an aqueous solution of the acid-functional oligomer is meant herein that the oligomer is either completely or substantially completely dissolved in the aqueous medium so that it is present as a true (i.e. clear) solution or that some of the oligomer is dispersed in the aqueous medium and some of it is dissolved therein (the term "water-soluble" being similarly construed).

Thus, the acid-functional oligomer contains a sufficient concentration of acid functionality to render the polymer partially or more preferably fully soluble in aqueous media, if necessary by neutralization of acid groups of the polymer, as would e.g. be achieved by adjustment of the pH of the aqueous medium. (If the acid-functional oligomer is only partially soluble in the aqueous medium of the emulsion, it will exist therein partly dispersed and partly dissolved). Usually, the medium in which the oligomer finds itself will be acidic (pH <7) and the acid groups will be carboxyl groups so that dissolution will be effected by raising the pH of the medium (usually the aqueous polymerisation medium in which the oligomer has been prepared) so as to neutralize the acid groups by the addition of a base, such as an organic or inorganic base, examples of which include organic amines such as trialkylamines (e.g. triethylamine, tributylamine), morpholine and alkanolamines, and inorganic bases such as ammonia, NaOH, KOH, and LiOH. Of course, the aqueous medium containing the acid functional oligomer may already be alkaline (or sufficiently alkaline) such that the acid groups (such as carboxyl groups) become neutralized without the requirement for positively adding a base to raise pH, or the acid groups may be or include very strong acid groups such as sulphonic acid groups (pK 1 to 2) so that neutralization may not be necessary to achieve dissolution. Further still, it is possible for acid monomers to be polymerised in salt form rather than as the free acid.

The aqueous emulsion polymerisation of step b) yields a hydrophobic emulsion polymer, this type of polymer being well understood by those skilled in the art. Generally speaking it may be considered herein as a water-insoluble polymer whose water-insolubility is maintained throughout the pH range. The hydrophobic nature of the polymer is achieved by virtue of the polymer containing a sufficient concentration of at least one hydrophobic monomer (i.e. in polymerised form) to render the polymer hydrophobic and water-insoluble throughout the pH range. Thus the emulsion polymer formed in the emulsion polymerisation process of step b) is insoluble in the aqueous medium of that polymerisation process regardless of any adjustments in pH to which the medium could be subjected.

The monomer system used for the preparation of the acid functional oligomer is any suitable combination of olefinically unsaturated monomers which is amenable to copolymerisation provided such a monomer system includes an acid-bearing comonomer(s) (preferably in sufficient concentration to render the resulting polymer fully or partially soluble in aqueous media as discusses supra), or a comonomer(s) bearing an acid-forming group which yields, or is subsequently convertible to, such an acid group (such as an anhydride, e.g. methacrylic anhydride or maleic anhydride, or an acid chloride) and also a comonomer(s) which imparts crosslinkability. Typically the acid-bearing comonomers are carboxyl-functional acrylic monomers or other ethylenically unsaturated carboxyl bearing monomers such as acrylic acid, methacrylic acid, itaconic acid and fumaric acid. Sulphonic acid-bearing monomers could also e.g. be used, such as styrene p-sulphonic acid (or correspondingly styrene p-sulphonyl chloride). An acid bearing monomer could be polymerised as the free acid or as a salt, e.g. the $NH_4$ or alkali metal salts of ethylmethacrylate-2-sulphonic acid or 2-acrylamido-2-methylpropane sulphonic acid, or the corresponding free acids. Other, non-acid functional non-crosslinking monomer(s) which may be copolymerized with the acid monomer(s) include acrylate and methacrylate esters and styrenes; also dienes such as 1,3-butadiene and isoprene, vinyl esters such as vinyl acetate, and vinyl alkanoates. Methacrylates include normal or branched alkyl esters of C1 to C12 alcohols and methacrylic acid, such as methyl methacrylate, ethyl methacrylate, and n-butyl methacrylate, and (usually C5 to C12) cycloalkyl methacrylates acid such as isobornyl methacrylate and cyclohexyl methacrylate. Acrylates include normal and branched alkyl esters of C1 to C12 alcohols and acrylic acid, such as methyl acrylate, ethyl acrylate, n-butyl acrylate, and 2-ethylhexyl acrylate, and (usually C5–C12) cycloalkyl acrylates such as isobornyl acrylate and cyclohexylacrylate. Styrenes include styrene itself and the various substituted styrenes, such as α-methyl styrene and t-butyl styrene. Nitriles such as acrylonitrile and methacrylonitrile may also be polymerised, as well as olefinically unsaturated halides such as vinyl chloride, vinylidene chloride and vinyl fluoride. Functional monomers which impart crosslinkability (crosslinking monomers for short) include epoxy (usually glycidyl) and hydroxyalkyl (usually C1–C12, e.g. hydroxyethyl)methacrylates and acrylates, as well as keto or aldehyde functional monomers such as acrolein, methacrolein and vinyl methyl ketone, the acetoacetoxy esters of hydroxyalkyl (usually C1–C12) acrylates and methacrylates such as acetoacetoxyethyl methacrylate and acrylate, and also keto-containing amides such as diacetone acrylamide. The purpose of using such functional monomer is to provide subsequent crosslinkability in the resulting polymer system as discussed. (In principle the functional monomer used for imparting crosslinkability could be acid-bearing monomer, but this is not usual).

Typically, the acid functional oligomer is derived from a monomer system which contains 1–45 weight % of acid comonomer(s), preferably 3–30 weight % and more preferably 3–20 weight %; 0.5 to 20 weight %, preferably 1 to 15 weight %, and particularly 1 to 10 weight % of crosslinking monomer(s); and 98.5–50 weight % of non acid functional, non-crosslinking comonomer(s), preferably 96–65 weight %, and more preferably 96–75 weight %. The non acid functional, non-crosslinking comonomer(s) in some cases is usefully selected from one or more of methyl methacrylate, styrene, ethyl acrylate, n-butyl methacrylate and n-butyl acrylate while the acid monomer is for example methacrylic acid and/or acrylic acid. Useful oligomers of this type are derived from a monomer system which comprises 3–12 weight % methacrylic acid and/or acrylic acid, 1 to 10 weight % of diacetone acrylamide and/or acetoacetoxy ethylmethacrylate, 50–90 weight % methyl methacrylate, 0–30 weight % of one or more of ethyl acrylate, n-butyl methacrylate and n-butyl methacrylate and 0–40 weight % styrene.

The oligomer from step a) should have a number average molecular weight within the range of from 500–50,000, preferably 2000–25,000 and particularly 3,000–19,000. (Polymer molecular weights may be determined by gel permeation chromatography calibrated using an appropriate known polymer as standard). The Tg of the oligomer should be in the range from 10 to 125° C., more preferably 50 to 125° C., and particularly 70 to 125° C.

The aqueous emulsion polymerisation process employed in step b) to form the hydrophobic polymer, may, apart from the incorporation of the acid functional oligomer from step a), be that of a conventional aqueous emulsion polymerisation process and basically as described above when discussing the use of such a process for the preparation of the acid-functional oligomer. However, an important preferred feature of the invention is that it is often possible to eliminate or much reduce the requirement for the addition of a surfactant to act as an emulsifier in the polymerisation of step b), because the acid functional oligomer itself can fulfil such a function (i.e. act as an emulsifying agent). Thus the aqueous emulsion resulting from step b) preferably contains a very low level of such added emulsifier (not counting the oligomer itself), with usually less than 0.5% (preferably less than 0.25%, and often zero) based on the total weight of monomers charged being used, and with the only surfactant present preferably being that remaining from the oligomer polymerisation (not counting the oligomer itself). In fact the overall level of surfactant (not counting the oligomer itself) is preferably <1% more preferably <0.5%, particularly <0.35%, based on the total weight of monomers charged for the hydrophobic polymer.

The monomer system employed for the formation of the hydrophobic polymer must be such that the resulting polymer is hydrophobic as described. Similar non acid functional, non crosslinking monomers to those used for making the oligomer may be employed, and in particular styrenes, such as styrene itself, α-methlystyrene, o-, m- and p-methylstyrene, o-, m- and p-ethylstyrene, p-chlorostyrene and p-bromostyrene; normal and branched acrylic and methacrylic esters of alkanols (usually 1–12C) and cycloalkanols (usually C5–C12) such as methyl methacrylate, ethyl methacrylate, n-butyl methacrylate, t-butyl methacrylate, 2-ethylhexyl methacrylate, isobornyl methacrylate, and cyclohexyl acrylate and the corresponding acrylates; vinyl esters such as vinyl acetate and vinyl alkanoates; vinyl halides such as vinyl chloride; vinylidene halides such as vinylidene chloride; dienes such as 1,3-butadiene and isoprene—but of course their selection must be such as to provide a resulting Tg which is at least 25° C. below that of the oligomer. A functional monomer(s) for imparting crosslinkability (which is not normally an acid monomer) may optionally be included, examples of which include hydroxy and epoxy functional (meth)acrylates such as hydroxyalkyl (usually C1–C12) methacrylate e.g. 2-hydroxyethyl methacrylate, glycidyl methacrylate, and the corresponding acrylates, as well as keto- and aldehyde-functional monomers such as acrolein, methacrolein, and methyl vinyl ketone, acetoacetoxy esters of hydroxyalkyl (usually C1–C12) acrylates and methacrylates such as acetoacetoxyethyl acrylate or methacrylate, and also keto or aldehyde-containing amides such as diacetone acrylamide.

Acid functional monomers could also be included as comonomers (e.g. acrylic or methacrylic acid), although at such a level (depending on their nature) as to not affect the hydrophobic character of the resulting polymer. Generally speaking, the monomer system used to make the hydrophobic polymer will usually contain less than 5 weight % of any acid-functional monomer(s) (no matter of what type), and preferably less than 2 weight %, and in some preferred embodiments none at all.

The hydrophobic polymer is in some cases usefully made from a monomer system which comprises at least one of $C_{1-10}$-alkyl methacrylate (such as n-butyl methacrylate), and $C_{3-10}$-alkyl acrylate (such as n-butyl acrylate), and usually, diacetone acrylamide and/or acetoacetoxyethyl methacrylate.

The polymerisation to make the hydrophobic polymer could be carried out using a chain transfer agent, but (unlike in the preparation of the oligomer) is usually effected without the use of such a material.

The number average molecular weight of the hydrophobic polymer is usually $\geq 50,000$, more usually $\geq 100,000$. The upper limit does not usually exceed 5,000,000.

The Tg of the hydrophobic polymer should be at least 25° C. below, more preferably at least 40° C. below the Tg of the oligomer. Usually, the Tg of the hydrophobic polymer will be within the range of from −20° C. to 50° C., more usually from 0° C. to 40° C.

The aqueous solution of the oligomer of step a) is present during the emulsion polymerisation of step b) to make the hydrophobic polymer.

The presence of the oligomer in the polymerisation of step b) can be effected in various ways, with the following being exemplary.

In one embodiment the aqueous solution of the oligomer is admixed with all of the monomers to be used in the formation of the hydrophobic polymer and an otherwise conventional "all-in-one" batch polymerisation (with no further addition of monomer(s)) is carried out to make the latter.

In another embodiment, the polymerisation is basically still a batch one, with all of the oligomer solution being present in the polymerisation vessel prior to the start of polymerisation with some of the monomer system for the hydrophobic polymer, with the remainder of the monomer system for the hydrophobic polymer being added quickly in one addition a while after the polymerisation has commenced.

In a further embodiment, the polymerisation is still basically a batch one, with all of the oligomer solution being present in the polymerisation vessel prior to the start of the polymerisation, but the monomer system for the hydrophobic polymer is now split into several equal parts (batches). These parts are added and polymerised consecutive to one another in order to obtain more control over the polymerisation; therefore effectively it is a polybatch method.

In other embodiments, semi-batch processes are employed in which part (or none) of the monomer system for the hydrophobic polymer is present prior to the start of polymerization in the polymerisation reaction vessel and part (or the entire amount) is fed to the reaction medium in the polymerisation vessel during the course of polymerisation.

In one such embodiment, the aqueous oligomer solution is present (in part) in the reaction medium for the polymerisation while part of the aqueous oligomer solution is mixed with the entire monomer system for the hydrophobic polymer (acting as an emulsifier) and the latter fed to the reaction medium in the polymerisation vessel during the polymerisation.

In another embodiment, the entire oligomer solution is present in the reaction vessel prior to the start of polymerisation and the entire monomer system for the hydrophobic polymer is fed to the vessel during the polymerisation, i.e. there is no oligomer present in the monomer feed.

In a further embodiment, all of the aqueous oligomer solution is present in the reaction vessel prior to the start of the polymerisation together with part of the monomer system for the hydrophobic polymer, and the remainder of the monomer system fed during polymerisation (i.e. without oligomer in the feed).

In a still further embodiment part of the oligomer solution is present in the reaction vessel prior to start of the polymerisation together with part of the monomer system for the hydrophobic polymer, and the remainder of the monomer system admixed with the remainder of the oligomer solution is fed during polymerisation.

In at least some embodiments of the invention, it is believed that the aqueous emulsion produced after the formation of the hydrophobic polymer may be in the form of an "inverted core-shell" latex, in which the hydrophobic polymer has formed a core domain in the oligomer—with oligomer encapsulating the hydrophobic polymer particles or forming a shell round them, or carrying the hydrophobic polymer particles in its swollen matrix. Alternatively, it may be more realistic to speak of the oligomer simply in terms of being a seed for the polymerisation process to form the hydrophobic polymer—irrespective of the actual structure of the resulting polymer system that is produced, of which we are not entirely certain. Accordingly, we do not wish to be bound by any physical structure which might be assumed or proposed for the resulting aqueous latex of the polymer system of the invention.

Preferably the amount of crosslinking agent in step c) that is employed is such that the ratio of the number of crosslinker groups present in the oligomer and (if employed) in the hydrophobic polymer to the number of reactive groups (for crosslinking purposes) in the crosslinking agent is within the range of from 10/1 to 1/3, preferably 2/1 to 1/1.5.

The crosslinker in step c) is usually combined with the aqueous emulsion from step b) by adding thereto after the polymerisation of step b) (sometimes just before use of the composition), although it may in principle also be combined by performing the polymerisation of step b) in the presence of the crosslinking agent, i.e. steps c) and b) become combined. A combination of both incorporation expedients may also in principle be used.

It is a preferred feature of the invention that the low molecular weight of the oligomer produced in step a) is achieved using a process which is other than that known to the art as catalytic chain transfer polymerisation, the use of which is not usual in the process of this invention although it may in principle be used. This process is that where a low molecular weight polymer is produced using the technique of radical polymerisation, using a free-radical initiator, in which molecular weight is controlled using a catalytic amount of a transition metal complex, and in particular a cobalt chelate complex, this technique being known in the art as a catalytic chain transfer (CCT) polymerisation. Such a technique has been described fairly extensively in the literature within the last decade or so. For example, various literature references, such as N. S. Enikolopyan et al, J. Polym. Sci., Polym. Chem. Ed., Vol 19, 879 (1981), disclose the use of cobalt II porphyrin complexes as chain transfer agents in free radical polymerisation, while U.S. Pat. No. 4,526,945 discloses the use of dioxime complexes of cobalt II for such a purpose. Various other publications, e.g. U.S. Pat. No. 4,680,354, EP-A-0196783 and EP-A-0199436, describe the use of certain other types of cobalt II chelates as chain transfer agents for the production of oligomers of olefinically unsaturated monomers by free-radical polymerisation. WO-A-87/03605 on the other hand claims the use of certain cobalt III chelate complexes for such a purpose, as well as the use of certain chelate complexes of other metals such as iridium and rhenium. Finally, copending application PCT/GB94/01692 (publication WO-A-95/04767 published Feb. 16, 1995) discloses a process for the preparation of an aqueous polymer emulsion which in one embodiment comprises a) preparing an aqueous solution of an acid-functional oligomer using a CCT polymerisation process and b) conducting an aqueous emulsion polymerisation to form a hydrophobic polymer in the presence of the oligomer solution. Both the oligomer and hydrophobic polymer may optionally include crosslinker groups and the composition can optionally include a crosslinking agent. The disclosure does not discuss or teach a process having the selection of features and integers as defined in the invention process. In particular, none of the example compositions include an oligomer with crosslinker groups, and none have oligomers with Tg within the range of 10–125° C. and which are also at least 25° C. higher than the Tg of the hydrophobic polymer.

It will be appreciated that the oligomer and optionally the hydrophobic polymer possess functional groups for imparting latent crosslinkability to the composition (i.e. so that crosslinking takes place e.g. after the formation of a coating therefrom) when combined with the crosslinking agent in step c). For example, one or both polymers could carry functional groups such as hydroxyl groups and the composition subsequently formulated in step c) with a crosslinking agent such as a polyisocyanate, melamine, or glycoluril; or the functional groups on one or both polymers could include keto or aldehyde carbonyl groups and the subsequently formulated crosslinker in step c) could be a polyamine or polyhydrazide such as adipic acid dihydrazide, oxalic and dihydrazide, phthalic acid dihydrazide, terephthalic acid dihydrazide, isophorone diamine and 4,7-dioxadecane-1,10 diamine. It will be noted that such crosslinking agents will effect crosslinking with the functional crosslinker groups of the oligomer, and also the hydrophobic polymer if present by virtue of forming covalent bonds, and are not crosslinking agents which would effect crosslinking by virtue of the formation of ionic bonds, as e.g. by the addition of metal ions to react with polymer-bound carboxylate ions.

The minimum film forming temperature (MFFT) of a composition as used herein is the temperature where the composition forms a smooth and crackfree coating or film using DIN 53787 and when applied using a Sheen MFFT bar SS3000.

Koenig hardness as used herein is a standard measure of hardness, being a determination of how the viscoelastic properties of a film formed from the composition slows down a swinging motion deforming the surface of the film, and is measured according to DIN 53157 NEN5319.

As is well known, the glass transition temperature of a polymer is the temperature at which it changes from a glassy, brittle state to a plastic, rubbery state.

The solids content of an aqueous composition of the invention is usually within the range of from about 20 to 65 wt % on a total weight basis, more usually 30 to 55 wt %. Solids content can, if desired, be adjusted by adding water or removing water (e.g. by distillation or ultrafiltration).

The relative amounts of the oligomer and the hydrophobic polymer in the aqueous polymer composition are preferably such that the weight % of the oligomer, based on the weight of the oligomer plus the hydrophobic polymer of the polymer composition, is preferably within the range of from 1 to 70 weight %, more preferably 5 to 50 weight %.

The aqueous compositions of the invention may be used in various applications and for such purposes may be optionally further combined or formulated with other additives or components, such as defoamers, rheology control agents, thickeners, dispersing and stabilizing agents (usually surfactants), wetting agents, fillers, extenders, fungicides, bacteriocides, coalescing and wetting solvents (although solvents are not normally required), plasticisers, anti-freeze agents, waxes and pigments.

The aqueous compositions may e.g. be used, appropriately formulated if necessary, for the provision of films, polishes, varnishes, lacquers, paints, inks and adhesives. However, they are particularly useful and suitable for providing the basis of protective coatings for wooden substrates (e.g. wooden floors), and plastics, paper and metal substrates.

The compositions once applied may be allowed to dry naturally at ambient temperature, or the drying process may be accelerated by heat. Crosslinking can be developed by allowing to stand for a prolonged period at ambient temperature (several days) or by heating at an elevated temperature (e.g. 50° C.) for a much shorter period of time.

The present invention is now further illustrated, but in no way limited, by reference to the following examples. Unless otherwise specified all parts, percentages, and ratios are on a weight basis. The prefix C before an example indicates that it is comparative.

The glass transition temperatures of oligomers in the examples were the values in °C. determined experimentally using differential scanning calorimetry DSC, taking the peak of the derivative curve as Tg, or calculated from the Fox equation (as for the hydrophobic polymers—see following). Sometimes both methods were used and in such cases the values obtained were identical.

The glass transition temperatures of hydrophobic polymers in the examples were calculated by means of the Fox equation. Thus the Tg, in degrees Kelvin, of a copolymer having "n" copolymerised comonomers is given by the weight fractions W of each comonomer type and the Tg's of the homopolymers (in degrees Kelvin) derived from each comonomer according to the equation:

$$\frac{1}{Tg} = \frac{W_1}{Tg_1} + \frac{W_2}{Tg_2} + \ldots \frac{W_n}{Tg_n}$$

The calculated Tg in degrees Kelvin may be readily converted to °C. (If the hydrophobic polymer is a homopolymer, its Tg is simply that of the polymerised monomer—normally available from the literature). In two cases, the Tg's of the hydrophobic polymers were measured by DSC as well as being calculated; the values obtained were virtually identical.

In the examples the following abbreviations are used:

| | |
|---|---|
| MMA = | methyl methacrylate |
| DAAM = | diacetone acrylamide |
| AAEM = | acetoacetoxy ethyl methacrylate |
| MAA = | methacrylic acid |
| EA = | ethyl acrylate |
| AP = | ammonium persulphate |
| TM = | total monomer |
| s/s = | solids/solids |
| 3MPA = | 3-mercaptopropionic acid (chain transfer agent) |
| LMKT = | dodecyl mercaptane (chain transfer agent) |
| SA = | stoichiometric amount |
| FM = | free monomer content |
| d = | dispersity (Mn/Mw when Mw = wt average mol wt) |
| BMA = | n-butyl methacrylate |
| BA = | n-butyl acrylate |
| S = | styrene |
| DMEA = | dimethylethanolamie |
| t-BHPO = | tert-butyl hydroperoxide |
| EDTA = | ethylenediamine tetraacetic acid |
| ADH = | adipic acid dihydrazide |
| ALMA = | allyl methacrylate |
| RT = | room temperature |

A typical recipe and procedure for the preparation of an aqueous solution of an acid-functional oligomer for use in the invention process is as follows.

Recipe for Oligomer OL1

Composition EA/MMA/DAAM/MAA=12.08/73.32/8/6.6

Surfagene FAZ 109 V (phosphate emulsifying agent): 0.5% on TM (s/s). 25% In the reactor; 75% in the feed.

AP: 0.3% on TM (s/s). Added as a separate feed during emulsion polymerisation (solids of the feed is 1.5% in dem. water).

LMKT: 4.5% on TM.

NaHCO$_3$: 0.3% on TM. 67% In the reactor; 33% in the feed.

Neutralization: 2 SA NH$_3$.

Solids of the neutralised solution: 27%.

Logsheet and Procedure for the Preparation of the Oligomer OL1

| Nr | Component | Amount (g) |
|---|---|---|
| 1 | H$_2$O | 910.75 |
| 2 | Surfagene FAZ 109 V | 3.09 |
| 3 | AP (1.5% (s/s) in demin. water) | 98.96 |
| 4 | NaHCO$_3$ | 1.0 |
| 5 | H$_2$O | 216.88 |
| 6 | MMA | 362.76 |
| 7 | DAAM | 39.58 |
| 8 | MAA | 32.66 |
| 9 | EA | 59.79 |
| 10 | Surfagene FAZ 109 V | 9.28 |
| 11 | NaHCO$_3$ | 0.49 |
| 12 | LMKT (dodecylmercaptane) | 22.27 |
| 13 | NH$_3$ (25%) | 56.6 |
| 14 | H$_2$O | 56.6 |
| 15 | H$_2$O | 39.22 |

Charge 1, 2 and 4 to the reactor. Heat the batch to 70° C. and add 5% of the preemulsified feed 5–12. Heat the batch to 80° C., add 30% of 3 and wait for 5 minutes. Start feeding the preemulsified feed 5–12 and the initiator feed 3. The reaction temperature is 85±2° C. The monomer feed should take 60 minutes; The initiator feed should take 70 minutes. Rinse the feed tank with 15. Keep the batch at 85–90° C. for another 30 minutes after the feed has been completed. The oligomer dispersion is a white, low viscosity product. Cool down to 80° C. and add the solution of 13 and 14 slowly. Keep at 80° C. for another 30 minutes. The oligomer dispersion will slowly change into a clear, low viscosity solution. Cool down to 25° C.

Specifications

| | |
|---|---|
| solids | 27–28% |
| pH | 10 |
| viscosity (mPas @ 25° C.) | 150 |
| sediment before sieving (%) | <0.2 |
| sediment after sieving (%) | 0.05–0.1 |
| FM (ppm) | <100 ppm (typical values: <10 ppm EA, 35 ppm MMA, 115 ppm MAA |
| Tg (DSC) (°C.) | 75° C. |
| Mn | 4100 |
| d | 2.3–2.4 |

EXAMPLE 1

A typical recipe and procedure for the preparation of an invention composition by the "preemulsified feed method" is as follows.

Recipe

Composition: Oligomer part: (see above for OL1) Polymer part: BMA/BA/DAAM=74.1/22.9/3 Tg (polymer part, calculated) (°C.): 0

Oligomer/polymer (s/s): 60/100 (=37.5/62.5) 40% of the oligomer used in the reactor: 60% of the oligomer is used to emulsify the monomer feed.

AP: 0.3% on TM (s/s). Added as a separate feed (2.5% solids). 0.2% on TM in the reactor.

Solids: 37%

Logsheet and Procedure for Composition of Ex 1

| Nr. | Component | Amount (g) |
|---|---|---|
| 1 | H$_2$O | 94.33 |
| 2 | Oligomer OL1 solution | 326.53 |
| 3 | AP | 0.75 |
| 4 | H$_2$O | 219.80 |
| 5 | BMA | 276.98 |
| 6 | BA | 85.42 |
| 7 | DAAM | 11.21 |
| 8 | Oligomer OL1 solution | 489.79 |
| 9 | DMEA | .37 |
| 10 | H$_2$O | 43.71 |
| 11 | AP | 1.12 |
| 12 | H$_2$O | 50.00 |

Charge 1–3 to the reactor. Charge 4 and 8 to the feed tank. Mix for 5 minutes. Add a mixture of 5–7 and 9 to the stirred solution of 4 and 8. Emulsify the feed. Add 10% of the preemulsified feed to the reactor. Heat the reactor to 85±2° C. Start feeding the preemulsified feed in 90 minutes to the reactor. The initiator feed 10 and 11 should take 100 minutes. Rinse the feedtank with 12. Keep the batch at 85±2° C. for 30 minutes. Cool down to 40–45° C. Add 13.1 g of ADH (solid) to the dispersion (0.9 SA). Rinse with 20 g demin. water. Keep the batch at 40–45° C. for 30 minutes. Cool down to RT.

Specifications

| | |
|---|---|
| solids (%) | 37–37.5% |
| pH | 9.5 |
| viscosity (mPas @ 25° C.) | 50 |
| sediment before sieving (%) | <0.2 |
| sediment after sieving (%) | 0.05–0.1 |
| FM (ppm) | <300 ppm (typical values <10 ppm EA, <25 ppm MMA, <125 ppm BA, <200 ppm BMA |
| MFFT (°C.) | 4 |
| Koenig Hardness | 76 sec |

EXAMPLE 2

Recipe

Composition: Oligomer part: (see above for OL1) Polymer part: BMA/BA/DAAM=74.1/22.9/3. Tg (polymer part, calculated) (°C.): 0

Oligomer/polymer (s/s): 100/100 All oligomer in the reactor

AP: 0.5% on TM (s/s); 40% in the reactor, 60% as a separate feed (2.5% solids in demin. water)

Solids: 37%

Logsheet and Procedure for Composition of Example 2

| Nr. | Component | Amount (g) |
|---|---|---|
| 1 | H$_2$O | 75.93 |
| 2 | Oligomer OL1 solution | 900.19 |
| 3 | AP | .49 |
| 4 | BMA | 180.26 |
| 5 | BA | 55.59 |
| 6 | DAAM | 7.29 |
| 7 | H$_2$O | 29.16 |
| 8 | AP | 0.73 |
| 9 | H$_2$O | 50.0 |

Charge 1 to reactor and dissolve 3. Add 2. Charge 10% of the monomers 4–6 to the reactor. Heat the batch to 85±2° C. Start feeding the monomers 4–6 and the initiator feed (8 dissolved in 7). The monomer feed should take 60 minutes, the initiator feed should take 70 minutes. Rinse with 9. Keep the batch at 85±2° C. for one hour. Cool down to 40±2° C. Add a solution of 11.55 g of ADH dissolved in 103.97 g of demin. water (0.7 SA). Keep the batch at 40±2° C. for 30 minutes.

Specifications

| solids | 37–37.5% |
|---|---|
| pH | 9.5 |
| viscosity (mPas @ 25° C.) | 60 |
| sediment before sieving (%) | 0.2 |
| sediment after sieving (%) | 0.1–0.2 |
| FM (%) | <0.2 |
| MFFT (°C.) | 0 |
| Koenig Hardness | 96 sec |

EXAMPLE 3

A typical recipe and procedure for the preparation of an invention composition by a "batch method" is as follows:

Recipe
  Composition: Oligomer part: (see above for OL1) Polymer part: BMA/BA/DAAM =74.1/22.9/3 Tg (polymer part, calculated) (°C.): O
  Oligomer/polymer (s/s): 60/100 All oligomer in the reactor
  Initiation system: 0.26% t-BHPO on TM (s/s) in the reactor 0.05% i-ascorbic acid on TM (s/s) in the reactor 5.07% FeEDTA on t-BHPO (s/s) in the reactor 0.21% i-ascorbic acid on TM (s/s) fed into the reactor
  Solids: 35%

Logsheet and Procedure for Composition of Example 3

| Nr. | Component | Amount (g) |
|---|---|---|
| 1 | H$_2$O | 231.11 |
| 2 | Oligomer OL1 solution | 823.98 |
| 3 | BMA | 138.06 |
| 4 | BA | 42.58 |
| 5 | DAAM | 5.59 |
| 6 | DMEA | 0.19 |
| 7 | t-BHPO (32.1% slurry in demin.water) | 1.51 |
| 8 | FeEDTA (1% solution *) | 2.46 |
| 9 | i-ascorbic acid (3.96% in demin. water) | 2.36 |
| 10 | i-ascorbic acid (1.21% in demin. water) | 32.42 |
| 11 | BMA | 138.06 |
| 12 | BA | 42.58 |
| 13 | DAAM | 5.59 |
| 14 | DMEA | 0.19 |
| 15 | t-BHPO (32.18% slurry in demin.water) | 1.51 |
| 16 | FeEDTA (1% solution) | 2.46 |
| 17 | H$_2$O | 202.44 |
| 18 | i-ascorbic acid (3.96% in demin. water) | 2.36 |
| 19 | i-ascorbic acid (1.21% in demin. water) | 32.42 |

* Made from FeSO$_4$, EDTA, NaOH and water.

Charge 1 and 2 to the reactor. Mix for 15 minutes. Add 3–6 to the reactor. Add 7 followed by 8. Heat the batch to 35° C. Keep the batch at this temperature for 1 hour. Add 9. The temperature will rise to about 57° C. Keep at peak temperature for 15 minutes. Start feeding 10. The feed should take 30 minutes. Let the temperature drift. Keep the batch at the reaction temperature for 15 minutes. Cool down to 35° C. Add 11–14 to the reactor, followed by 15, 16 and 17. Keep the batch at 35° C. for 1 hour. Add 18. The temperature will rise to about 42° C. Keep the batch at peak temperature for 15 minutes. Start feeding 19. The feed should take 30 minutes. Let the temperature drift. Cool down to 40±2° C. Add 12.53 g ADH to the dispersion (0.9 SA). Rinse with 10 g demin. water. Keep the batch at 40±20° C. for 30 minutes. Cool down to room temperature.

Specifications

| solids | 35–35.5% |
|---|---|
| pH | 9.5 |
| viscosity (mPas @ 25° C.) | 80 |
| sediment before sieving (%) | <0.2 |
| sediment after sieving (%) | 0.05–0.1 |
| FM (%) | <0.2 |
| MFFT (°C.) | 10 |
| Koenig Hardness | 84 sec |

A further acid-functional oligomer OL2 in aqueous solution was prepared as follows.

Recipe for Oligomer OL2
  Composition MMA/MAA/DAM/BMA=36/8/8/48
  soldium lauryl sulphate (emulsifying agent): 0.5% on TM (s/s). 25% in the reactor; 75% in the feed. AP: 0.3% on TM (s/s). Added as a separate feed during emulsion polymerisation (solids of the feed is 1.5% in dem. water).
  LMKT and 3MPA: 2.4% on TM
  Neutralization: 1 SA NH$_3$
  solids of the neutralized solution: 27–28%

Logsheet and Procedure for the Preparation of the Oligomer OL2

| Nr | Component | Amount (g) |
|---|---|---|
| 1 | H$_2$O | 876.5 |
| 2 | SLS | 2.0 |
| 3 | AP (1.5% (s/s) in demin water | 95.9 |
| 4 | Water | 207.1 |
| 5 | SLS | 6.0 |
| 6 | LMKT | 7.7 |
| 7 | 3MPA | 3.8 |
| 8 | MMA | 172.7 |
| 9 | MAA | 38.4 |
| 10 | DAAM | 38.4 |
| 11 | BMA | 230.2 |
| 12 | NH$_3$ (25%) | 60.7 |
| 13 | H$_2$O | 60.6 |

1 and 2 are charged to the reactor. 4–11 are charged to the feedtank and preemulsified by stirring. Heat the batch to 70° C. and add 5% of the preemulsified feed to the reactor. Heat the batch to 80° C. and add 30% of 3. Wait 5 minutes and start feeding the remainder of the preemulsified feed aver 60 minutes and simultaneously feed the remainder of 3 over 70 minutes at 85° C. Hold at 85° C. for 30 minutes and then add 12 and 13. Hold at 80° C. for another 20 minutes and cool to room temperature.

Specifications

| solids | 27–28% |
|---|---|
| pH | 8.4 |
| viscosity (mPas @ 25° C.) | 130 |
| sediment | <0.1% |
| Tg (DSC, °C.) | 60 |
| Mn | 8,400 |
| d | 2.5 |

EXAMPLE 4

An invention composition was prepared using a 2-step polybatch method as follows:

Recipe
  Composition: Oligomer part: (see above for OL2) Polymer part: MMA/BA/DAAM=38/58/4 Tg polymer part, calculated (°C.)=0 oligomer/polymer (s/s): 100/100

All oligomer in the reactor

Initiator system 0:26% t-BHPO on TM (s/s) in the reactor. 0.05% i-ascorbic acid on TM (s/s) in the reactor. 5.07% FeEDTA on t-BHPO (S/S) in the reactor. 0.21% i-ascorbic acid on TM (s/s) fed into the reactor.

solids: ca. 35%.

Logsheet and Procedure for Composition of Ex 4

| Nr | Component | Amount (g) |
|----|-----------|------------|
| 1  | Water | 16.3 |
| 2  | oligomer OL2 solution | 972.4 |
| 3  | MMA | 92.4 |
| 4  | BA | 141.0 |
| 5  | DAAM | 9.7 |
| 6  | tBHPO (30% slurry in demin. water | 2.1 |
| 7  | Fe EDTA (1% solution*) | 3.16 |
| 8  | i-ascorbic acid 1% in demin. water | 12.2 |
| 9  | i-ascorbic acid 1% in demin. water | 51.1 |
| 10 | Water | 10 |
| 11 | ADH | 13.4 |

(* see Example 3).

Charge 1 and 2 to the reactor and 3–5 to the feedtank. Heat the reactor contents to 35° C. Add 50% of 3–5 to the reactor and mix for 30 minutes. Add 50% of 6, 7 and 8 to the reactor; the polymerisation will start. Let the temperature drift to appr. 55° C. Keep at this temperature for 15 minutes. Feed 50% of 9 in 30 minutes. Cool to 35° C. and repeat this procedure for the other 50% of the components, but now cool to 40° C. instead of 35° C. Add 10 and 11 over 30 minutes. Cool to RT.

Specifications

| solids | 35–36% |
|--------|--------|
| pH | 8.4 |
| viscosity (mPas @ 25° C.) | 180 |
| sediment before sieving (%) | <0.1% |
| FM (%) | <0.1% |
| MFFT (°C.) | 10° C. |
| Koenig hardness | 103 sec |

An aqueous solution of an acid-functional oligomer OL3 lacking any monomer for the purpose of providing subsequent covalent crosslinking monomer was prepared as follows:

Recipe for oligomer OL3

Composition MMA/MAA=90/10 sodium lauryl sulphate (emulsifying agent): 0.5% on TM (s/s). 25% in the reactor; 75% in the feed.

AP: 0.3% on TM (s/s). Added as a separate feed during emulsion polym. (solids of the feed is 1.5% in demin. water).

LMKT and 3MPA: 2.4% on TM

Neutralization: 1 SA $NH_3$ solids of the neutralized solution 25%

Logsheet and Procedure for the Preparation of OL3

| Nr | Component | Amount (g) |
|----|-----------|------------|
| 1  | $H_2O$ | 911.8 |
| 2  | SLS | 1.8 |
| 3  | AP (1.5% (s/s) in demin. water | 87.2 |
| 4  | Water | 188.3 |
| 5  | SLS | 5.5 |
| 6  | LMKT | 7.0 |
| 7  | 3MPA | 3.5 |
| 8  | MMA | 392.4 |
| 9  | MAA | 43.6 |
| 10 | $NH_3$ (25%) | 34.5 |
| 11 | $H_2O$ | 124.4 |

1 and 2 are charged to the reactor. 4–9 are charged to the feedtank and preemulsified by stirring. Heat the batch to 70° C. and add 5% of the preemulsified feed to the reactor. Heat the batch to 80° C. and add 30% of 3. Wait 5 minutes and start feeding the remainder of the preemulsified feed over 60 minutes and simultaneously feed the remainder of 3 over 70 minutes at 85° C. Hold at 85° C. for 30 minutes and then add 10 and 11. Hold at 80° C. for another 20 minutes and cool to RT.

Specifications

| solids | 25% |
|--------|-----|
| pH | 8.3 |
| viscosity | 55 |
| sediment | <0.1% |
| Tg (DSC and calculated °C.) | 110° C. |
| Mn | 9700 |
| d | 2.5 |

EXAMPLE C5

In this comparative example, a composition lacking groups intended for providing covalent crosslinking was prepared using the oligomer OL3 to investigate the effect on MFFT/Koenig hardness balance of ionic crosslinking. A polybatch method was used (as with Example 4). (The composition had oligomer/hydrophobic polymer Tg values in accordance with the requirements of the invention process).

Recipe

Composition Oligomer part: (see above for OL3) Polymer part: BMA/BA =74/26 Tg polymer part, calculated (°C.)=0

Oligomer/polymer (s/s): 60/100

All oligomer in the reactor

Initiator system 0.26% t-BHPO on TM (s/s) in the reactor 0.05% i-ascorbic acid on TM (s/s) in the reactor 5.07% FeE =A on t-BHPO in the reactor 0.21% i-ascorbic acid on TM (s/s) fed into the reactor solids: ca. 35%

Logsheet and Procedure for Preparation of Composition of Ex C5

| Nr | Component | Amount (g) |
|----|-----------|------------|
| 1  | Water | 198.4 |
| 2  | Oligomer OL3 solution | 800 |
| 3  | BMA | 296 |
| 4  | BA | 104 |
| 5  | tBHPO (30% slurry in demin. water) | 3.5 |
| 6  | Fe EDTA (1% solution*) | 5.2 |

-continued

| Nr | Component | Amount (g) |
|----|-----------|------------|
| 7 | i-ascorbic acid 1% in demin water | 20.0 |
| 8 | i-ascorbic acid 1% in demin water | 84.0 |
| 9 | Water | 209.3 |

(*see Example 3)

Charge 1 and 2 to the reactor and 3 and 4 to the feedtank. Heat to 35° C. Add 50% of 3 and 4 to the reactor and mix for 30 minutes. Add 50% of 5, 6 and 7 to the reactor; the polymerisation will start. Let the temperature drift to appr. 55° C. Keep at this temperature for 15 minutes. Feed 50% of 8 in 30 minutes. Cool to 35° C. and repeat this procedure for the other 50% of the components, but now cool to 40° C. instead of 35° C. Add 9 over 30 minutes. Cool to RT.
Specifications

| | |
|---|---|
| solids | 35% |
| pH | 8.3 |
| MFFT (° C.) | 10 |
| Koenig hardness | 80 sec |
| viscosity (mPas @ 25° C.) | 200 |
| sediment (%) | <0.1% |
| FM (%) | <0.1% |

100 g of the above latex was formulated with a mixture of 0.57 g demin. water, 0.27 g zinc oxide, 0.34 g ammonium carbonate and 0.49 g 25% ammonium hydroxide solution in water. This provides a Zn metal ion crosslinking latex with the following values:

| | |
|---|---|
| MFFT (° C.) | 37 |
| Koenig hardness | 63 secs |

Thus the effect of ionic crosslinking has been to both increase MFFT and lower Koenig hardness.

Further acid-functional oligomers OL4 and OL5 in aqueous solution possessing covalent crosslinker functionality were prepared as follows:
Recipe for Oligomer OL4
  Composition EA/MMA/DAAM/MAA=27.4/58/8/6.6
    The preparative procedure was exactly as for that of oligomer OL1 (using Surfagene FAZ 109 V as emulsifying agent etc).
Recipe for Oligomer OL5
  Composition MMA/DAAM/MAA=84/6/10 The preparative procedure was exactly as for that of oligomer OL2 (using SLS as emulsifier etc)
Logsheet and Procedure for the Preparation of the Oligomers OL4 and OL5

| Nr | Component | OL4 Prep Amount (g) | OL5 Prep Amount (g) |
|----|-----------|---------------------|---------------------|
| 1 | H₂O | 909.7 | 846.2 |
| 2 | Surfagene FAZ109V | 3.2 | — |
| 3 | AP (1.5% in demin water) | 101.8 | 95.5 |
| 4 | SLS (sodium lauryl sulphate 30% solids) | — | 2 |
| 5 | NaHCO₃ | 1.0 | — |
| 6 | H₂O | 214.9 | 207.1 |
| 7 | MMA | 295.2 | 402.9 |
| 8 | DAAM | 40.7 | 28.8 |
| 9 | MAA | 33.6 | 48.0 |
| 10 | EA | 139.3 | — |
| 11 | Surfagene FAZ109V | 9.5 | — |
| 12 | SLS | — | 6.0 |
| 13 | NaHCO₃ | 0.5 | — |
| 14 | LMKT | 8.1 | 7.7 |
| 15 | 3MPA | — | 3.8 |
| 16 | NH₃ (12.5%) | 103.2 | 151.7 |
| 17 | H₂O | 39.3 | 0.9 |

Charge 1, 2 and 4, 5 to the polymerisation reactor. Heat the reactor contents to 70° C. and add 5% of the pre-emulsified feed 6–15. Heat the reactor contents to 80° C. and charge 30% of 3 to the reactor and wait for 5 minutes. Feed the remainder of 6–15 and 3 at 85° C. over periods of 60 minutes and 70 minutes respectively. Rinse the feedtank with 17 and keep the reactor contents at 85° C. for another 30 minutes. Slowly add 16 to the reactor and keep at 80° C. for another 30 minutes. The oligomer will dissolve or partly dissolve in this time. Cool down to 25° C.
Specifications for the Oligomers OL4 and OL5

| | |
|---|---|
| solids | 27–28% |
| pH | 10 for OL4, 10 for OL5. |
| viscosity (mPas at 25° C.) | 150 for OL4, 140 for OL5 |
| sediment | <0,2% |
| FM | <100 ppm |
| Mn | ca.9000 for OL4, ca.8000 for OL5 |
| d | 2.3–2.4 |
| Tg for OL4 (calculated ° C.) | 60 |
| Tg for OL5 (DSC and calculated ° C.) | 110 |

The oligomer solutions of OL4 and OL5 were employed in the preparation of the following invention compositions of Examples 6, 7 and 8 using the polybatch method described for Examples 4 and C5.

EXAMPLES 6, 7, and 8

Recipes

| | |
|---|---|
| Ex 6 | Composition: BMA/BA/DAAM = 74.1/22.9/3 |
| | Oligomer: OL4 |
| | Tg polymer part, calculated (° C.) = 3 |
| Ex 7 | Composition: BMA/BA/S/DAAM = 26/31/39/4 |
| | Oligomer: OL5 |
| | Tg polymer part, calculated (° C.) = 20 |
| Ex 8 | Composition: BMA/BA/S/DAAM = 46.7/10.3/39/4 |
| | Oligomer: OL5 |
| | Tg polymer part, calculated (° C.) = 39 |

Other Procedures as for Examples 4, and C5.
Logsheet and Procedure for Preparation of Compositions of Exs 6, 7 and 8

| Nr | Component | Ex 6 Prep Amount (g) | Ex 7 Prep Amount (g) | Ex 8 Prep Amount (g) |
|----|-----------|----------------------|----------------------|----------------------|
| 1 | Water | 221.6 | 186.0 | 323.5 |
| 2 | oligomer OL4 solution | 829.7 | — | — |
| 3 | oligomer OL5 solution | — | 809.8 | 809.8 |
| 4 | BMA | 259.8 | 94.8 | 170.2 |
| 5 | BA | 80.1 | 113.0 | 37.5 |
| 6 | S | — | 142.1 | 142.1 |
| 7 | DAAM | 10.5 | 14.6 | 14.6 |

-continued

| Nr | Component | Ex 6 Prep Amount (g) | Ex 7 Prep Amount (g) | Ex 8 Prep Amount (g) |
|----|-----------|----------------------|----------------------|----------------------|
| 8  | tBHPO (30% slurry in demin water) | 3 | 3.1 | 3.1 |
| 9  | FeEDTA (1% solution) | 4.5 | 4.7 | 4.7 |
| 10 | i ascorbic acid (1% in demin water) | 17.5 | 18.2 | 18.2 |
| 11 | i ascorbic acid (1% in demin water) | 73.6 | 76.5 | 76.5 |
| 12 | Water | 8.0 | 96.6 | 81.4 |
| 13 | ADH | 13.1 | 12.0 | 12.8 |

Charge 1–3 to the polymerisation reactor and 4–7 to the feedtank. Heat to 35° C. Add 50% of 4–7 to the reactor and mix for 30 minutes. Add 50% of 8, 9 and 10 to the reactor and the polymerisation will start. Let the temperature drift to appr. 55° C. Keep at this temperature for 15 minutes. Feed 50% of 11 in 30 minutes. Cool to 35° C. and repeat this procedure for the other 50% of the components, but now cool to 40° C. instead of 35° C. Add 12–13 in 30 minutes. Cool to RT.

The MFFT's and Koenig hardness values were:

|      | MFFT (° C.) | Koenig Hardness (sec) | pH  | Visc. (mPas @ 25° C.) |
|------|-------------|-----------------------|-----|-----------------------|
| Ex 6 | 6           | 100                   | 8.3 | 150                   |
| Ex 7 | 28          | 132                   | 8.2 | 170                   |
| Ex 8 | 45          | 157                   | 8.4 | 190                   |

The specifications for sediment and FM were similar to those for Example 4.

The compositions of Examples 1, 2, 3, 4, C5, 6, 7 and 8 were assessed for water and solvent resistance using spot tests conducted in the following manner:

A coating of an example is applied at 100 μm wet film thickness to a test chart (Leneta Company, Form 2C). It is allowed to dry at RT for 4 hours and at 50° C. for 16 hours.

A wad of cotton wool, soaked in water or ethanol 48%, is placed on the coating and maintained in a saturated state for 16 hours by placing a glass over the wad. The wad is removed and the coating is assessed for appearance (whitening, cracks or dissolution).

If no damage at all is observed, a number of 5 is awarded. If the coating has completely dissolved a number of 0 is awarded. Numbers from 4 to 1 stand for increasing damage to the appearance of the coating.

The spot test results for the Examples were as follows:

|         | Ex 1 | Ex 2 | Ex 3 | Ex 4 | Ex C5 | Ex 6 | Ex 7 | Ex 8 |
|---------|------|------|------|------|-------|------|------|------|
| water   | 5    | 5    | 5    | 5    | 3     | 5    | 5    | 5    |
| ethanol | 3    | 4    | 4    | 3    | 2     | 4    | 5    | 4    |

It will be observed that all the invention compositions possess excellent water resistance and reasonably good ethanol resistance. By contrast, the comparative composition of Example C5 has significantly poorer water and ethanol resistance.

A further acid-functional oligomer OL6 was prepared having no crosslinker monomer intended for effecting covalent crosslinking (in an oligomer/polymer composition) after coating formation, but having instead a difunctional monomer (ALMA) for effecting grafting (or precrosslinking) during the formation of the oligomer/polymer composition. Recipe for Oligomer OL6

Composition BA/MMA/ALMA/MAA=34/45.4/0.5/20
SLS (emulsifying agent): 0.5% on TM (s/s)
AP: 0.3% on TM (1.5% in demin. water)
LMKT: 5.5% on TM.
neutralization: 1 SA $NH_3$
solids of neutralized solution: 24 %.

Logsheet and Procedure for Preparation of the Oligomer OL6

| Nr | Component | Amount (g) |
|----|-----------|------------|
| 1  | $H_2O$ | 1073.3 |
| 2  | AP (1.5% in demin. water) | 84.7 |
| 3  | SLS (sodium lauryl sulphate, 30% solids) | 1.8 |
| 4  | $H_2O$ | 188.4 |
| 5  | MMA | 192.7 |
| 6  | MAA | 84.7 |
| 7  | SLS | 5.3 |
| 8  | LMKT | 23.2 |
| 9  | $NH_3$ (12.5%) | 133.9 |
| 10 | $H_2O$ | 9.1 |
| 11 | BA | 144.0 |
| 12 | ALMA | 2.1 |

Charge 1 and 3 to the reactor. Heat the reactor contents to 70° C. and add 5% of the pre-emulsified feed 4–8. Heat the reactor contents to 80° C. and charge 30% of 2 to the reactor and wait for 5 minutes. Start feeding, with the reactor contents at 85° C., 4–7 and 11, 12 over a period of 60 minutes and 2 over a period of 70 minutes. Rinse the feedtank with 10 and keep the reactor contents at 85° C. for another 30 minutes. Slowly add 9 to the reactor and keep at 80° C. for another 30 minutes. The oligomer will dissolve in this time. Cool down to 25° C.

Specifications

| solids | 24% |
| pH | 8.4 |
| viscosity (mPas) | >1000 |
| sediment | <0,2% |
| FM | <100 ppm |
| Tg (DSC and calculated ° C.) | 49 |

EXAMPLE C9

In this comparative example, a polymer composition is prepared using the oligomer OL6 in order to yield a product with grafting (pre-crosslinking) between the oligomer and polymer phases in the resulting emulsion composition (i.e. as in the preferred process of EP 0,587,333). A polybatch procedure was used. (The composition had oligomer/hydrophobic Tg polymer values in accordance with the requirements of the invention process).

Recipe

| Composition | |
|---|---|
| Oligomer part | OL6 |
| Polymer part | BA = 100% (homopolymer) |
| Tg polymer part, (° C.) | −45 |
| oligomer/polymer (s/s) | = 100/100 |
| Initiator system | |
| 0.26% tBHPO on TM (s/s) in the reactor | |
| 0.05% i-ascorbic acid on TM (s/s) in the reactor | |
| 5.07% FeEDTA on tBHPO (s/s) | |

-continued

Composition in the reactor
0.21% i-ascorbic acid on TM
(s/s) fed into the reactor
all oligomer in reactor
solids 30%

Logsheet and Procedure for Preparation of Example C9

| Nr | Component | Amount (g) |
|---|---|---|
| 1 | Water | 275.9 |
| 2 | Oligomer OL6 solution | 897.6 |
| 3 | BA | 224.4 |
| 4 | tBHPO (30% slurry in demin water) | 2.0 |
| 5 | FeEDTA (1% solution) | 3.0 |
| 6 | i ascorbic acid 1% in demin water | 11.0 |
| 7 | i ascorbic acid 1% in demin water | 47.2 |
| 8 | Water | 38.9 |

Charge 1 and 2 to the reactor and 3 to the feedtank. Heat the reactor contents to 35° C. Add 50% of 4, 5 and 6 to the reactor and the polymerisation will start. Let the temperature drift to appr. 55° C. Keep at this temperature for 15 minutes. Feed 50% of 7 in 3 minutes. Cool to 35° C. and repeat this procedure for the other 50% of the components, but now cool to 40° C. instead of 35° C. Add 8 in 30 minutes. Cool to RT.
Specifications

| | |
|---|---|
| solids | 30% |
| pH | 8.4 |
| MFFT (° C.) | 0 |
| Koenig Hardness | 29 sec |
| viscosity (mPas @ 25° C.) | >1000 |
| sediment (%) | <0.2% |
| FM (%) | <100 ppm |

EXAMPLES C10 AND C11

In these comparative examples, oligomer/hydrophobic polymer compositions are prepared in which the oligomer is solubilized by neutralization in the aqueous phase subsequent to the polymerisation to form the hydrophobic polymer (instead of before effecting this polymerisation—as in all the preceding examples), this being the preferred technique of EP 0,587,333 to effect solubilization. In Example C11, the monomer system contains no monomer intended for covalent crosslinking while in Example C10, the monomer system does include such crosslinker monomer (i.e. as per the present invention but solubilizing the oligomer after polymerisation instead of before polymerisation to form the hydrophobic polymer). (Both compositions had oligomer/hydrophobic polymer Tg values in accordance with the requirements of the invention process).
Recipe for Example C10
  Oligomer phase composition EA/MMA/DAAM/MAA= 12.1/73.3/8/6.6 Tg (DSC and calculated °C.): 85
  Polymer phase composition BMA/BA/DAAM=74/1/ 22.9/3 Tg (DSC and calculated °C.): 3
  0.5 SLS (s/s) on TM used as the surfactant. 0.3 AP (1.5% solution in demin. water) used as a separate initiator feed for both phases
  oligomer/polymer (s/s): 60/100
Recipe for Example C11
  oligomer phase composition EA/MMA/MAA=12.1/81.3/ 6.6 Tg (DSC and calculated °C.): 88
  Polymer phase composition BMA/BA=75.6/24.4 Tg (calculated °C.): 1 Tg (DSC °C.): 0 Otherwise identical with Example C10
Logsheet and Procedure for Examples C10 and C11

| Nr | Component | Ex C10 Amount (g) | Ex C11 Amount (g) |
|---|---|---|---|
| 1 | water | 800.4 | 800.4 |
| 2 | SLS (30% solids) | 2.2 | 2.2 |
| 3 | AP (1,5% in demin. water) | 131.3 | 131.3 |
| 4 | water | 102.9 | 102.9 |
| 5 | SLS (30% solids) | 3.3 | 3.3 |
| 6 | LMKT | 14.8 | 14.8 |
| 7 | EA | 28.6 | 28.6 |
| 8 | MMA | 173.3 | 192.2 |
| 9 | DAAM | 18.9 | — |
| 10 | MAA | 15.6 | 15.6 |
| 11 | BMA | 311.4 | 317.7 |
| 12 | BA | 96.2 | 102.5 |
| 13 | DAAM | 12.6 | — |
| 14 | water | 90.0 | 90.0 |
| 15 | ADH | 14.6 | — |
| 16 | NH$_3$ (12.5%) | 42.4 | 42.4 |

Charge 1 and 2 to the polymerisation reactor and heat to 85° C. Pre-emulsify 4–10 and charge 10% to the reactor. Then charge 20% of 3 to the reactor and wait for 5 minutes. Charge the remainder of the feed (4–10) in 50 minutes and charge 40% of 3 over a period of 60 minutes at 85%. This forms the oligomer. Charge 11–13 to the feed tank and feed this to the reactor in an additional 50 minutes. Simultaneously charge the remainder of 3 to the reactor over a period of 60 minutes at 85° C. Keep at 85° C. for another 30 minutes. This forms the hydrophobic polymer. Then slowly charge 16 to the reactor and wait for another 30 minutes. Cool to 25° C. and add 15 to the reactor (Example C10 only); rinse with 14.
Specifications:

| | |
|---|---|
| pH | 9–10 |
| solids | 37–38% |
| viscosity (mPas at 25° C.) | 1500 for Ex C10, 1570 for Ex C11 |
| FM | <100 ppm |
| sediment | <0.2% |
| MFFT (° C.) | 0 for Ex C10, 37 for Ex C11 |
| Koenig hardness | 52 sec for Ex C10, 13 sec for Ex C11 |

The water and ethanol resistances of the compositions of Examples C9, C10 and C11 were assessed (procedure described supra). These were as follows (the values for MFFT and Koenig hardness, given above, are also included):

| | Ex C9 | Ex C10 | Ex C11 |
|---|---|---|---|
| MFFT ° C. | 0 | 0 | 37 |
| hardness (sec) | 29 | 52 | 13 |
| water resist. | 4 | 3 | 5 |
| ethanol resist. | 0 | 2 | 0 |

It will be noted that the properties of the post neutralization Example C10 with crosslinking are extremely poor compared with those of the invention examples, both in terms of MFFT/Koenig hardness balance and water/ethanol resistance. The properties of the post neutralization Example C11 without crosslinking gives an even worse MFFT/

Koenig hardness balance and very poor ethanol resistance. The properties of the grafting (or pre-crosslinking) Example C9 are also very poor in terms of MFFT/Koenig hardness balance and ethanol resistance.

We claim:

1. Process for the production of an organic solvent-free aqueous crosslinkable polymer composition useful for coating, which process is organic solvent-free and comprises:

a) preparing an aqueous solution of an acid-functional oligomer built from olefinically unsaturated monomers, said oligomer having a number average molecular weight Mn within the range of from 500 to 50,000 and a glass transition temperature (Tg) within the range of 10 to 125° C., said oligomer being formed using an organic solvent-free aqueous emulsion or aqueous solution polymerisation process, and said acid functionality by itself or by neutralization rendering the oligomer water-soluble, and said oligomer also having crosslinker functional groups for imparting crosslinkability when the aqueous polymer composition is subsequently dried, b) conducting an aqueous emulsion polymerisation process to form an aqueous emulsion of a hydrophobic polymer from at least one olefinically unsaturated monomer in the presence of the aqueous solution of the oligomer, said hydrophobic polymer having a Tg which is at least 40° C. below the Tg of said oligomer, and said hydrophobic polymer optionally having crosslinker functional groups for imparting crosslinkability when the aqueous polymer composition is subsequently dried, and c) combining the aqueous emulsion from b) with a crosslinking agent by addition of the crosslinking agent after the polymerisation in step b) and/or performing the polymerisation in the presence of the crosslinking agent, said crosslinking agent being reactable with the crosslinker functional groups of the oligomer and (if present) of the hydrophobic polymer on subsequent drying to effect crosslinking, wherein said crosslinking agent is not an agent which effects crosslinking by the formation of ionic bonds, and wherein further, said polymer composition on drying has a Koenig hardness of at least 40 sec and said polymer composition has a minimum film forming temperature of ≦55° C.

2. Process according to claim 1 wherein said oligomer has a number average molecular weight of from 2,000 to 25,000.

3. Process according to claim 1 wherein said oligomer has a Tg within the range of from 50 to 125° C.

4. Process according to claim 3 wherein said oligomer has a Tg within the range of from 70 to 125° C.

5. Process according to claim 1 wherein said polymer composition on drying has a Koenig hardness of from 60 to 200 secs.

6. Process according to claim 1 wherein said polymer composition has a minimum film forming temperature of from 0 to 55° C.

7. Process according to claim 6 wherein said polymer composition has a minimum film forming temperature of from 0 to 30° C.

8. Process according to claim 1 wherein the resulting composition has Koenig hardness and minimum film forming temperature according to the following empirical relationship:

$$H \geq 1.5T + 70$$

where H is Koenig hardness in seconds and T is minimum film forming temperature in °C.

9. Process according to claim 8 wherein the empirical relationship is:

$$H \geq 1.5T + 90.$$

10. Process according to claim 1 wherein said oligomer is completely or partially, dissolved in the aqueous medium in step a).

11. Process according to claim 10 wherein dissolution of the oligomer is effected by neutralization of the acid groups thereof using a base.

12. Process according to claim 1 wherein said oligomer is derived from an olefinically unsaturated monomer system which includes an acid-bearing comonomer(s), or a comonomer(s) bearing an acid-forming group which yields, or is subsequently convertible to, such an acid group, and a comonomer(s) which has functional groups for imparting crosslinkability.

13. Process according to claim 12 wherein the acid bearing monomer(s) is selected from the group consisting of carboxyl-containing olefinically unsaturated monomers.

14. Process according to claim 13 wherein the monomer(s) is selected from the group consisting of carboxyl-functional acrylic monomers.

15. Process according to claim 14 wherein said carboxyl bearing monomer(s) is selected from the group consisting of acrylic acid, methacrylic acid, itaconic acid and fumaric acid.

16. Process according to claim 12 wherein said monomer system from which the oligomer is formed includes a non-acid functional non-crosslinking comonomer(s) selected from the group consisting of acrylate and methacrylate esters; styrenes, dienes, vinyl esters, nitriles, and olefinically unsaturated halides.

17. Process according to claim 16 wherein said non-acid functional non-crosslinking comonomer(s) is selected from the group consisting of methyl acrylate, ethyl acrylate, n-butyl acrylate, 2-ethylhexyl acrylate, methyl methacrylate, ethyl methacrylate, n-butyl methacrylate, isobornyl acrylate or methacrylate, cyclohexyl acrylate or methacrylate, styrene, alpha-methyl styrene, t-butylstyrene, acrylonitrile, methacrylonitrile, vinyl chloride, vinylidene chloride, vinyl fluoride, vinyl acetate, isoprene and 1,3-butadiene.

18. Process according to claim 12 wherein the functional groups for providing crosslinkability are selected from the group consisting of epoxy, hydroxyl, ketone and aldehyde, groups.

19. Process according to claim 12 wherein said comonomer(s) with functional groups for imparting crosslinkability is (are) selected from the group consisting of glycidyl acrylate or methacrylate, hydroxyethyl methacrylate or acrylate, acrolein, methacrolein, methyl vinyl ketone, acetoacetoxyethyl methacrylate or acrylate and diacetone acrylamide.

20. Process according to claim 12 wherein the acid-functional oligomer is derived from a monomer system comprising 1 to 45 weight % of acid-functional comonomer(s), 0.5 to 20 weight % of crosslinking comonomer (s) and 98.5 to 50 weight % of non-acid functional, non-crosslinking comonomer(s).

21. Process according to claim 20 wherein said oligomer is derived from a monomer system comprising 3 to 30 weight % of acid-functional comonomer(s), 1 to 15 weight % of crosslinking comonomer(s) and 96 to 65 weight % of non-acid functional, non-crosslinking comonomer(s).

22. Process according to claim 20 wherein the acid comonomer(s) is methacrylic acid and/or acrylic acid and the non-acid functional, non-crosslinking comonomer(s) is one or more selected from the group consisting of methyl methacrylate, styrene, ethylacrylate, n-butyl methacrylate and n-butyl acrylate.

23. Process according to claim 20 wherein said oligomer is derived from a monomer system which comprises 3 to 12 weight % of methacrylic acid and/or acrylic acid, 1 to 10 weight % of diacetone acrylamide and/or acetoacetoxyethyl methacrylate, 50 to 90 weight % of methyl methacrylate, 0 to 30 weight % of one or more of ethyl acrylate, n-butyl acrylate or n-butyl methacrylate and 0 to 40 weight % of styrene.

24. Process according to claim 1 wherein the aqueous emulsion polymerisation of step b) is performed using an amount of emulsifying agent(s) newly added for that step (excluding the oligomer) which is less than 0.5 weight % based on the total weight of monomers charged for step b).

25. Process according to claim 1 wherein the only emulsifying agent(s) which may be present (excluding the oligomer itself) is that remaining from the emulsifying agent(s) used in the oligomer polymerisation of step a).

26. Process according to claim 1 wherein the oligomer formed in step a) acts as an emulsifying agent in the polymerisation of step b).

27. Process according to claim 1 wherein the polymerisation processes in steps a) and b) are carried out in the same polymerisation vessel.

28. Process according to claim 1 wherein said hydrophobic polymer is derived from an olefinically unsaturated monomer system which includes a non-acid bearing, non-crosslink monomer(s).

29. Process according to claim 28 wherein said non-acid, non-crosslinking monomer(s) is selected from the group consisting of one or more of acrylate and methacrylate esters, styrenes, dienes, vinyl esters, nitriles, vinyl halides and vinylidene halides.

30. Process according to claim 29 wherein the acrylate and methacrylate esters are normal and branched alkyl esters of C1 to C12 alcohols, the styrenes are styrene, α-methyl styrene, o-, m- and p- methylstyrene, o-, m- and p-ethyl styrene, p-chlorostyrene, and p-bromostyrene, the dienes are 1,3-butadiene and isoprene, the vinyl ester is vinyl acetate, the vinyl halide is vinyl chloride, and the vinylidene halide is vinylidene chloride.

31. Process according to claim 28 wherein the monomer system used in the preparation of the hydrophobic polymer includes a crosslinking comonomer(s) having a functional group(s) for providing crosslinkability selected from the group consisting of epoxy, hydroxy, ketone and aldehyde groups.

32. Process according to claim 31 wherein said crosslinking comonomers(s) is one or more selected from the group consisting of glycidyl methacrylate or acrylate, hydroxyethyl methacrylate or acrylate, acetoacetoxy methacrylate or acrylate and diacetone acrylamide.

33. Process according to claim 28 wherein the monomer system used for the preparation of the hydrophobic polymer contains less than 5 weight % of any acid-functional comonomer.

34. Process according to claim 33 wherein the monomer system contains no acid-functional comonomer.

35. Process according to claim 1 wherein said hydrophobic polymer is made from a monomer system comprising at least one selected from the group consisting of C1–C10 alkyl methacrylates and C3–C10 alkyl acrylates, and diacetone acrylamide and/or acetoacetoxyethyl methacrylate.

36. Process according to claim 1 wherein said hydrophobic polymer has a number average molecular weight of at least 50,000.

37. Process according to claim 36 wherein the hydrophobic polymer has a number average molecular weight of at least 100,000.

38. Process according to claim 1 wherein the aqueous solution of the oligomer of step a) is admixed with all of the monomers to be used in the formation of the hydrophobic polymer and an otherwise conventional "all-in-one" batch polymerisation (with no further addition of monomer(s)) is carried out to make the hydrophobic polymer.

39. Process according to claim 1 wherein all of the oligomer solution of step a) is present in the polymerisation vessel used to make the hydrophobic polymer prior to the start of polymerisation together with some of the monomer system for the hydrophobic polymer, with the remainder of the monomer system for the hydrophobic polymer being added in one addition after the polymerisation has commenced.

40. Process according to claim 1 wherein all of the oligomer solution of step a) is present in the polymerisation vessel used to make the hydrophobic polymer prior to the start of the polymerisation, and the monomer system for the hydrophobic polymer is split into several equal parts (batches), these parts being added and polymerised consecutive to one another.

41. Process according to claim 1 wherein part (or none) of the monomer system for the hydrophobic polymer is present prior to the start of polymerisation in the polymerisation vessel used to make the hydrophobic polymer and part (or the entire amount) is fed to the reaction medium in the polymerisation vessel during the course of polymerisation.

42. Process according to claim 41 wherein the aqueous oligomer solution of step a) is present in part in the reaction medium for the polymerisation to make the hydrophobic polymer while part of the aqueous oligomer solution is mixed with the entire monomer system for the hydrophobic polymer and the latter fed to the reaction medium in the polymerisation vessel during the polymerisation.

43. Process according to claim 41 wherein the entire oligomer solution of step a) is present in the polymerisation vessel prior to the start of polymerisation and the entire monomer system for the hydrophobic polymer is fed to the vessel during the polymerisation, there being no oligomer present in the monomer feed.

44. Process according to claim 41 wherein all of the aqueous oligomer solution of step a) is present in the polymerisation vessel prior to the start of the polymerisation together with part of the monomer system for the hydrophobic polymer, and the remainder of the monomer system for the hydrophobic polymer fed during polymerisation, there being no oligomer in the feed.

45. Process according to claim 41 wherein part of the oligomer solution of step a) is present in the polymerisation vessel prior to start of the polymerisation to make the hydrophobic polymer together with part of the monomer system for the hydrophobic polymer, and the remainder of the monomer system for the hydrophobic polymer admixed with the remainder of the oligomer solution is fed during polymerisation.

46. Process according to claim 1 wherein the crosslinking agent is selected, depending on the crosslinking functionality in the oligomer and (if present) in the hydrophobic polymer, from the group consisting of a polyisocyanate, melamine, glycoluril, a polyamine, and a polyhydrazide.

47. Process according to claim 1 wherein the ratio of the number of crosslinker groups present in the oligomer and (if employed) in the hydrophobic polymer to the number of reactive groups (for crosslinking purposes) in the crosslinking agent is within the range of from 10/1 to 1/3.

48. Process according to claim 1 wherein the solids content of the resulting aqueous composition is within the range of from 20 to 65 wt % on a total weight basis.

49. Process according to claim 1 wherein the relative amounts of the oligomer and the hydrophobic polymer in the resulting aqueous composition is such that the wt % of the oligomer, based on the wt of the oligomer plus the hydrophobic polymer, is within the range of from 1 to 70 wt %.

50. Aqueous crosslinkable polymer composition which is organic solvent-free and is useful for coating, which composition is produced by a process which is organic solvent-free and comprises:
   a) preparing an aqueous solution of an acid-functional oligomer built from olefinically unsaturated monomers, said oligomer having a number average molecular weight Mn within the range of from 500 to 50,000 and a glass transition temperature (Tg) within the range of 10 to 125° C., said oligomer being formed using an organic solvent-free aqueous emulsion or aqueous solution polymerisation process, and said acid functionality by itself or by neutralization rendering the oligomer water-soluble, and said oligomer also having crosslinker functional groups for imparting crosslinkability when the aqueous polymer composition is subsequently dried,
   b) conducting an aqueous emulsion polymerisation process to form an aqueous emulsion of a hydrophobic polymer from at least one olefinically unsaturated monomer in the presence of the aqueous solution of the oligomer, said hydrophobic polymer having a Tg which is at least 40° C. below the Tg of said oligomer, and said hydrophobic polymer optionally having crosslinker functional groups for imparting crosslinkability when the aqueous polymer composition is subsequently dried, and
   c) combining the aqueous emulsion from b) with a crosslinking agent by addition of the crosslinking agent after the polymerisation in step b) and/or performing the polymerisation in the presence of the crosslinking agent, said crosslinking agent being reactable with the crosslinker functional groups of the oligomer and (if present) of the hydrophobic polymer on subsequent drying to effect crosslinking, wherein said crosslinking agent is not an agent which effects crosslinking by the formation of ionic bonds, and wherein further, said polymer composition on drying has a Koenig hardness of at least 40 sec and said polymer composition has a minimum film forming temperature of $\leq 55°$ C.

51. Composition according to claim 50 wherein said composition has Koenig hardness and minimum film forming temperature according to the following empirical relationship:

$$H \geq 1.5T+70$$

where H is Koenig hardness in seconds and T is minimum film forming temperature in °C.

52. Composition according to claim 51 wherein the empirical relationship is:

$$H \geq 1.5T+90.$$

53. A film, polish, varnish, lacquer, paint, ink or adhesive comprising a composition according to claim 50.

54. a composition according to claim 50 deposited as a protective coating on a wood, plastic, paper or metal substrate.

* * * * *